Dec. 28, 1965   R. A. BARBEAU ETAL   3,225,990
DIGITAL TAPE DRIVE SYSTEM
Filed Dec. 24, 1962   6 Sheets-Sheet 1

INVENTORS
RAYMOND A. BARBEAU
JOSEPH H. FAGUT
DWIGHT O. JOHNSON, JR.
EUGENE S. PEARSON

BY Bernard M. Goldman
ATTORNEY

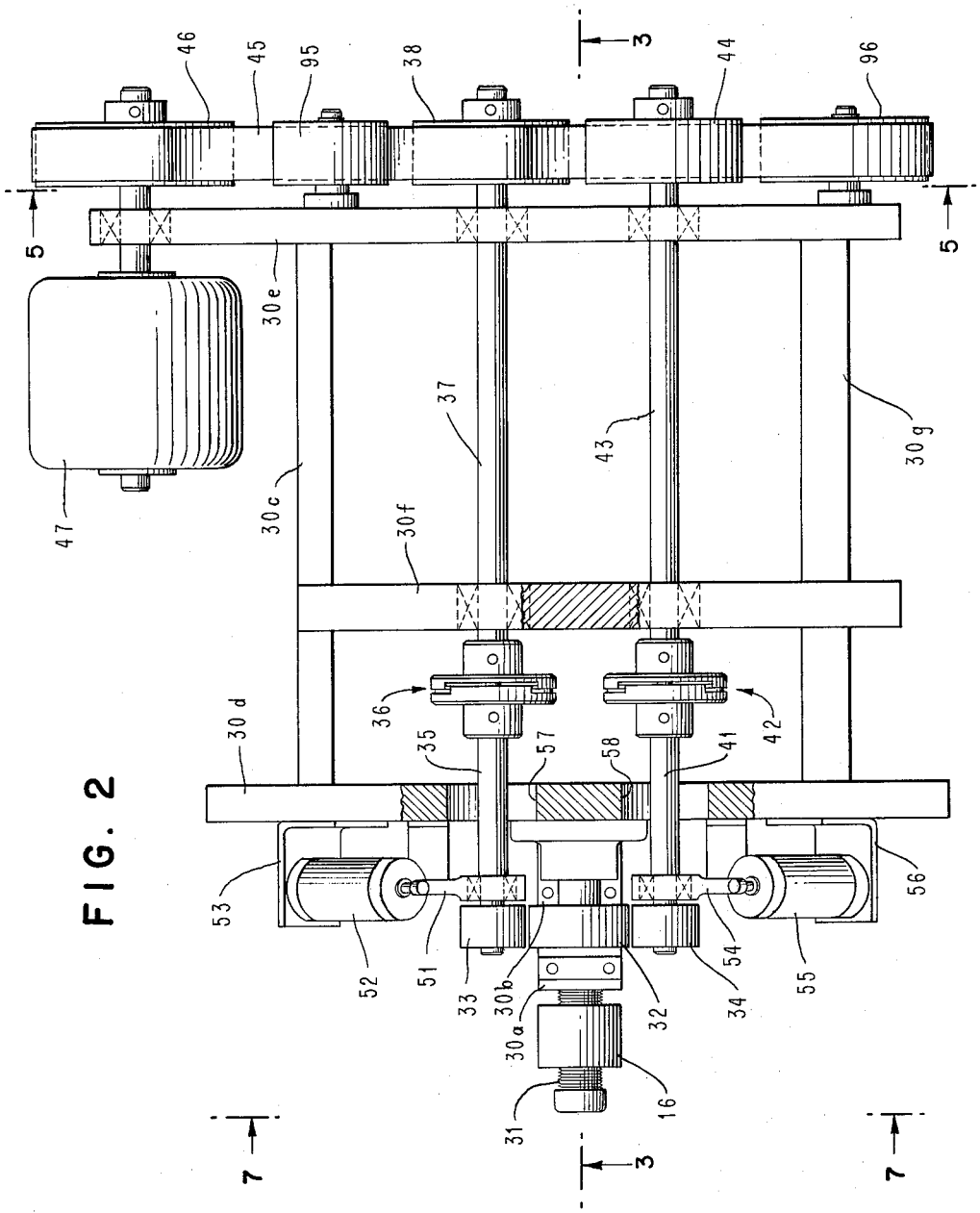

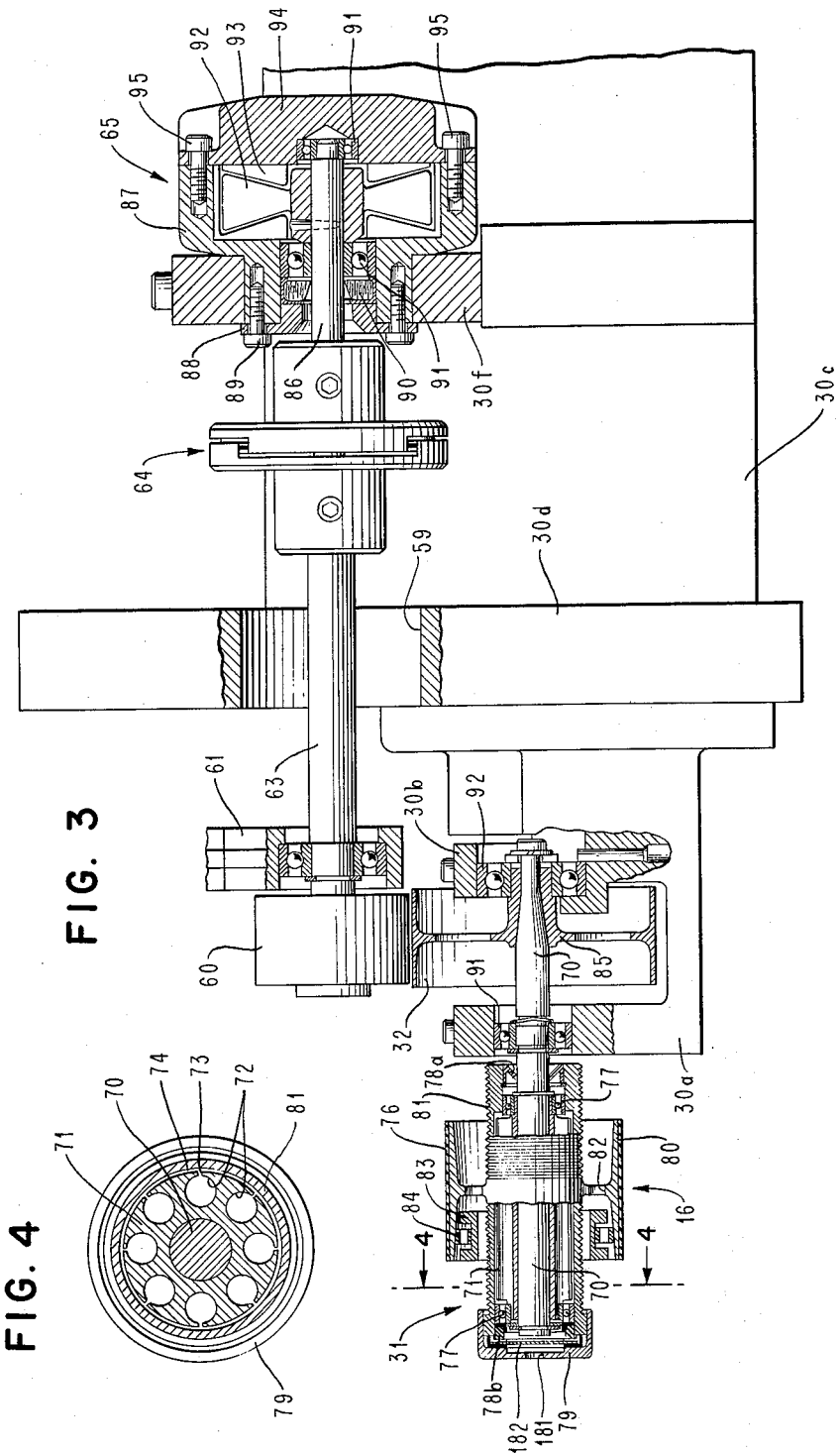

Dec. 28, 1965   R. A. BARBEAU ETAL   3,225,990
DIGITAL TAPE DRIVE SYSTEM
Filed Dec. 24, 1962   6 Sheets-Sheet 4
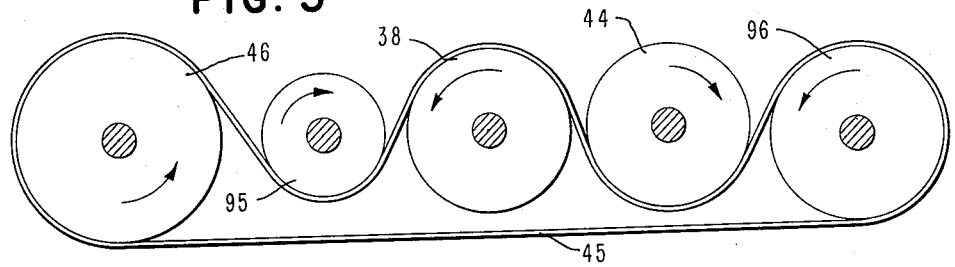
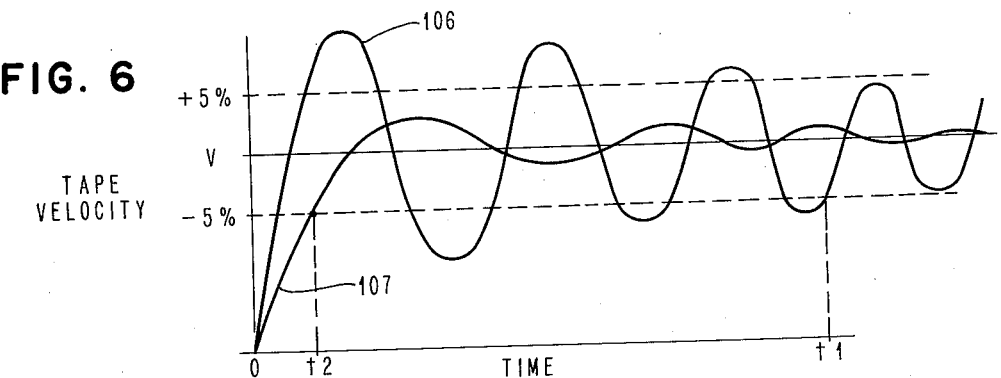
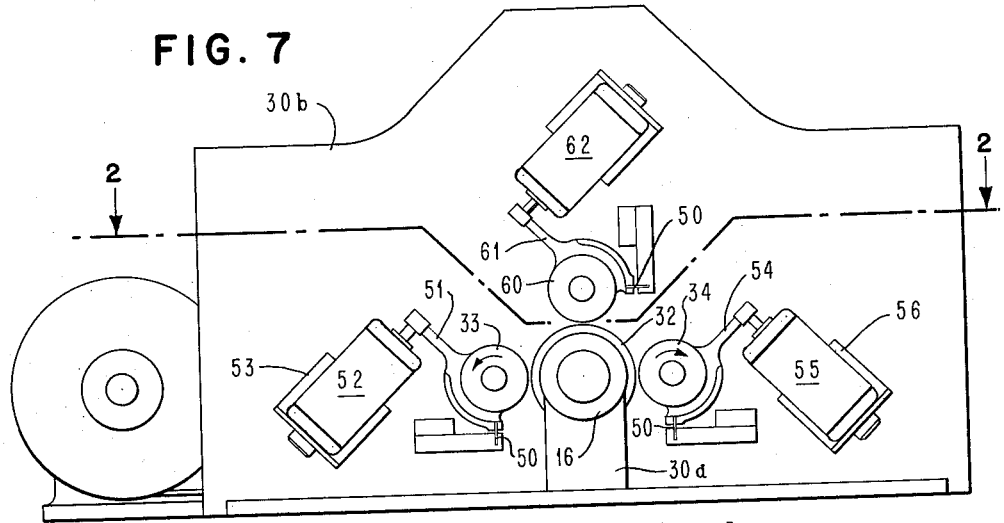
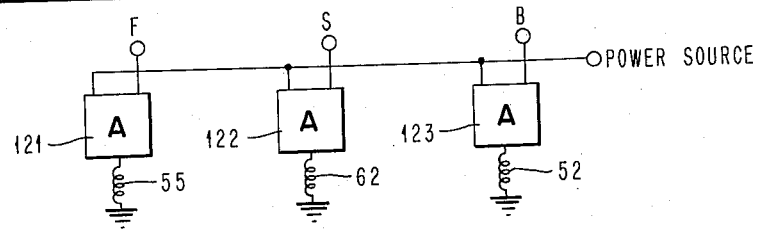

Dec. 28, 1965 R. A. BARBEAU ETAL 3,225,990
DIGITAL TAPE DRIVE SYSTEM
Filed Dec. 24, 1962 6 Sheets-Sheet 5

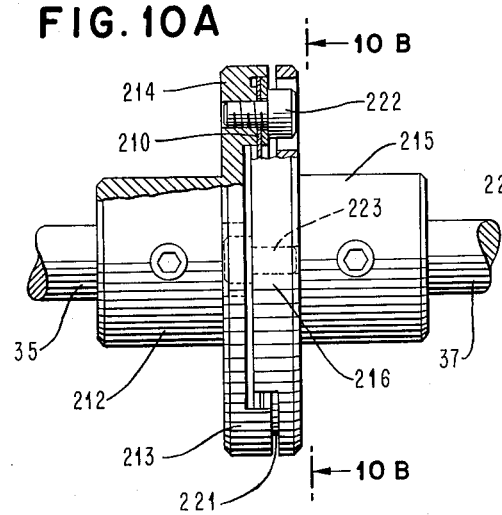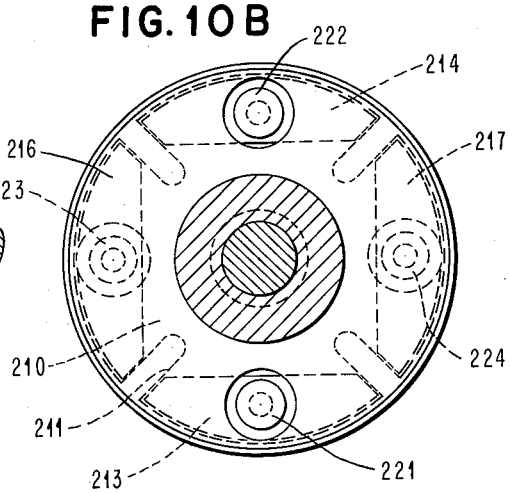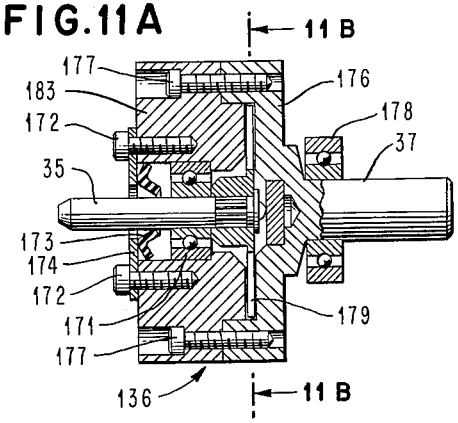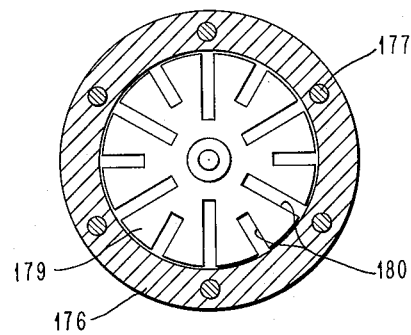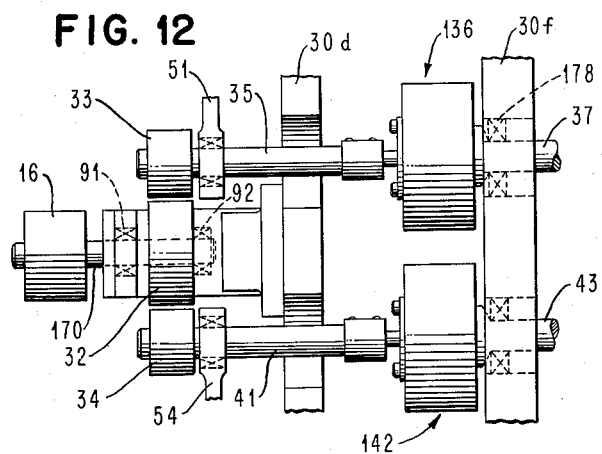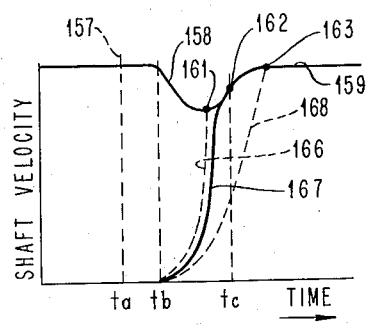

3,225,990
DIGITAL TAPE DRIVE SYSTEM
Raymond A. Barbeau and Joseph H. Fagut, Poughkeepsie, Dwight O. Johnson, Jr., Wappingers Falls, and Eugene S. Pearson, Poughkeepsie, N.Y., assignors to International Business Machines Corporation, New York, N.Y., a corporation of New York
Filed Dec. 24, 1962, Ser. No. 246,757
7 Claims. (Cl. 226—51)

This invention relates to a combination capstan and brake device for starting, driving at high velocity, and stopping tape in either direction with very high acceleration and deceleration.

A digital transport often must start, read a single data block (which can occupy less than an inch length of tape), stop, start, read another data block, stop, etc., at a rate that can exceed 100 data blocks per second. The data blocks might for example be separated from each other by a gap of ½ to ¾ inch of tape length. The speed of tape movement for writing or reading a tape block is commonly 75 or 112 inches per second. But the writing or reading speed need not be constant for a digital tape transport (as it must for audio) and may vary by as much as ±5% without causing any problem. Thus the acceleration from zero to 112 inches per second must occur in less than ⅜ inch of tape length. On the other hand, an audio tape transport moves tape at a much lower velocity such as 15 inches per second, and it must maintain constancy of velocity of much less than 1% variation in order to avoid prohibitive wow and flutter types of distortion. Consequently audio transports generally have no need for the repetitive starts and stops required of a digital transport.

In the prior art, capstans have long been used to drive magnetic tape, but they have not generally been used for braking. Furthermore, capstans generally have operated at a constant velocity. Thus it is presently common practice in digital tape transports to have two opposite and continuously rotating capstans, and a fixed and separate brake member. The tape is made to move in one direction or the other by selecting which of the two capstans it is to engage; and the tape is made to stop by removing the tape from a capstan and forcing it against the brake member, either by pneumatic means or a moving mechanical device such as a pinch roller.

In contrast to digital tape transports, audio tape transports often do not have brake devices that engage tape, but depend entirely upon stopping the reels to stop the tape. This is inherently a slow stopping arrangement because of the momentum of the reels, but the necessity for quick tape stopping and starting is not generally a requirement for audio tape transports as it invariably is with modern digital tape transports; which can be required to start and stop tape over a hundred times a second.

Thus the technique most often used in prior digital transports to obtain the very quick tape starts and stops was not by attempting to stop or start their high inertia capstans, but rather by moving the relatively low inertia tape to a capstan or brake.

The present invention improves upon prior techniques used to start, drive and stop tape in either direction in a digital tape transport. Hence the present invention does not use opposite constantly rotating capstans and a separate brake with means for moving the tape from one to the other in order to control tape movement. Instead, the present invention uses a single cylindrical device which always engages the tape. The single cylindrical device acts as a tape brake, as well as a tape capstan that can quickly drive the tape in either direction.

It has previously been known that oppositely rotating friction wheels can be used to selectively engage another friction wheel to drive it in one or the other rotational direction. But prior devices have supported high-inertia driving wheels on high-inertia elements which are incapable of the sudden movements necessary to obtain the very quick acceleration and deceleration needed by a digital tape, and therefore have been considered impractical as a substitute for the capstan and brake in a digital tape transport.

This invention uses a fluid coupling with a friction wheel arrangement to avoid intolerable tape jitter and skew and to increase the life of its frictionally engaging surfaces, as well as decrease the start and stop delays prior to writing or reading. It has been found that a solid coupling between a friction driven wheel and a cylindrical tape-engaging member for accelerating, driving and stopping tape causes undesirable vibrations to the tape during its quick accelerations which can result in intolerably high amounts of jitter and skew for digital information being written on or read from the tape.

It is therefore an object of this invention to provide a single cylindrical drive and braking device that continuously engages the tape while it accelerates, drives, decelerates, and stops in either direction of movement without causing undue spurious vibrations resulting in excessive skew and jitter to data being written on or read from the tape.

It is another object of this invention to provide a single capstan device for a digital tape transport capable of starting or stopping a tape within less than one-quarter inch of tape length in a very small fraction of one second and having a reliability permitting over 100 million starts and stops without maintenance.

It is a further object of this invention to provide a fluid-coupling which has insignificant slippage during a steady-state driving operation or after a braking operation. "Insignificant" slippage while driving is a steady-state slippage of less than 1% of the input rotational velocity, and virtually no slippage when rotation has stopped.

The invention utilizes a cylindrical member that continuously engages the tape throughout the tape operation. A stiff fluid-coupling arrangement connects between the cylindrical member and a drive source. A driven friction wheel drives the capstan. Frictional elements, in addition to the fluid, contribute to the coupling, such as bearings and seals which provide a frictional connection in parallel to fluid connection. The frictional connection can significantly contribute to prevention of creep while stopped, and to the avoidance of slippage during a steady-state moving load on the coupling, with the result that there is no significant slippage by the bearings and seals during steady-state operation. This can extend the life of the seals and bearings, since wear would be caused by rubbing due to slippage. Furthermore, an expansion diaphragm allows atmospheric and internal pressure and temperature variations without fluid being significantly forced through the seals. Three actuating members are provided adjacent to the driven friction wheel, two of which are constantly rotating in opposite directions. The third is a braking member which may be provided in the form of a friction wheel. A single driving fluid coupling can be placed between the driven friction wheel and the capstan. On the other hand, two driving fluid couplings can be placed respectively between each constantly rotating actuating member and its drive source. The couplings in the latter case are more critical because their dynamic-coupling responses must be matched with the acceleration response of the capstan to prevent undesired oscillations from being induced in the tape. A stiff braking fluid-coupling arrangement connects the braking wheel to a fixed member, such as a frame. In this case the braking energy is dissipated substantially within the fluid coupling to minimize wear on the surface of the friction members resulting from braking operations. Furthermore, the rotativeness of the braking wheel through the friction coupling distributes the wear evenly over its surface and maintains its round contour needed for accurate spacing alignment with the driven friction wheel. Three electro-mechanical devices are respectively connected to the three actuating members to permit selective engagement of any one of them with the driven friction wheel to drive it in one or the other opposite directions or to brake it.

The foregoing and other objects, features and advantages of the invention will be apparent from the following more particular description of the preferred embodiments of the invention, as illustrated in the accompanying drawings.

In the drawings:

FIGURE 2 is a top view of an assembly containing the invention.

FIGURE 3 is a view of section 3—3 in FIGURE 2.

FIGURE 4 is a view of section 4—4 in FIGURE 3, enlarged.

FIGURE 5 is a view of section 5—5 in FIGURE 2.

FIGURE 6 illustrates velocity-oscillation diagrams used in explaining the invention.

FIGURE 7 is a view of section 7—7 found in FIGURE 2.

FIGURE 8 illustrates a circuit for controlling capstan movement.

Figure 9A:
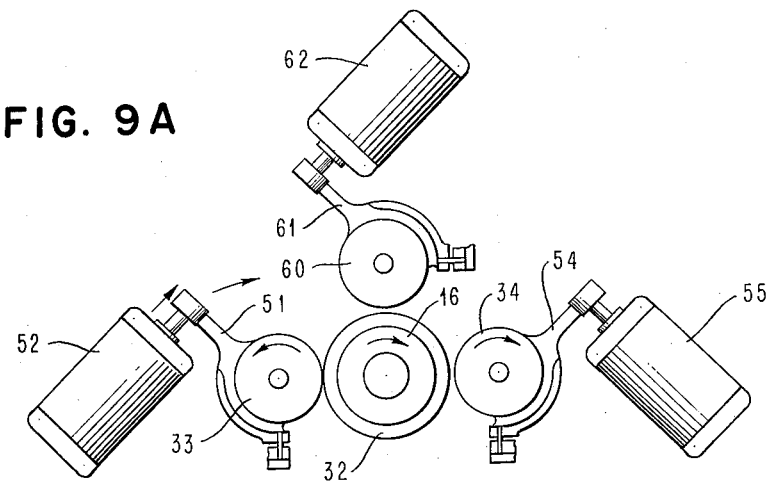
Figure 9B:
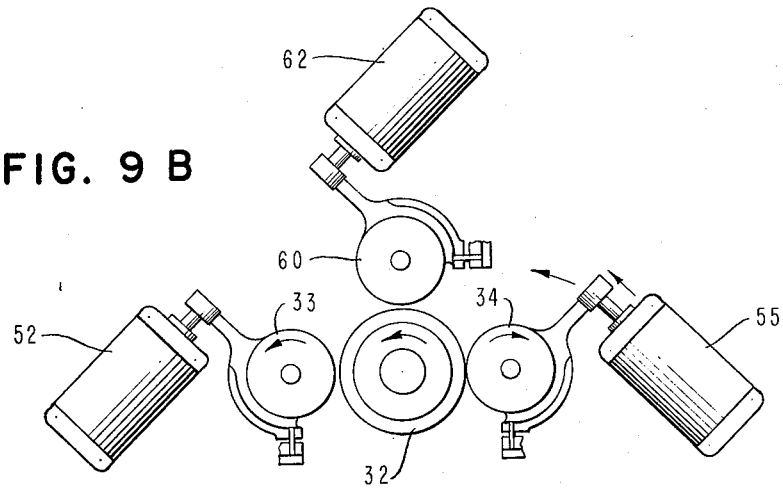

FIGURES 9A, B and C illustrate different directions of movement and braking, respectively, being transmitted to tape by the invention.

FIGURES 10A and B illustrate a universal joint connection.

FIGURES 11A and B show a fluid coupling usable in FIGURE 12.

FIGURE 12 shows a second embodiment of the invention.

FIGURE 13 illustrates the velocity response of coupled parts within FIGURES 11 and 12.

Figure 1:
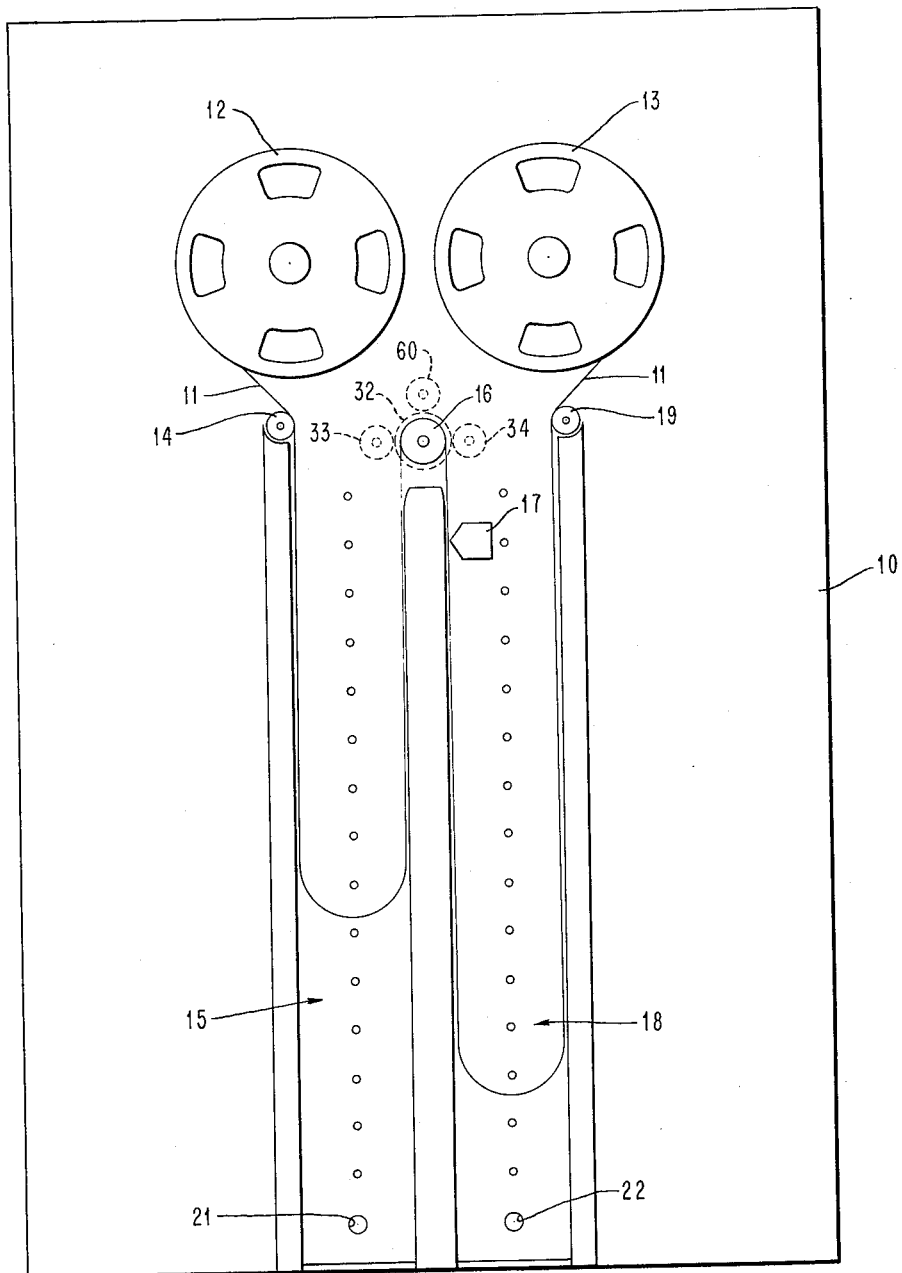
FIGURE 1 illustrates a front view of a digital-tape transport using the invention.

Digital tape transport 10 in FIGURE 1 shows the environment of the invention. Transport 10 includes a pair of tape reels 12 and 13 which are separately driven by independent servo motors and servo systems (not shown) of the type described in prior patent application Serial No. 165,482, filed January 11, 1962 by J. I. Aweida, D. K. Close and H. C. Pao and assigned to the same assignee as the present invention. As tape 11 moves from reel 12 it passes over an idler 14 into a vacuum column 15, over a driving and braking device 16 (to which this invention is directed) into another vacuum column 18 and out of it over an idler 19 onto the other reel 13. Vacuum is supplied to columns 15 and 18 by means (not shown because it is well known in the art) connected to ports 21 and 22 at the bottom of the respective columns. As the tape is moved into or out of one of the columns 18, it passes by the read-write set of heads 17. Heads 17 can be rotated away from the tape by means (not shown) to enable ease of loading and unloading the tape into and out of columns 15 and 18.

A loop-position sensor (not shown) operates with each column 15 and 18, to sense the position of the tape loop in each column to cause its respective reel 12 or 13 to respond with whatever movement is required to maintain each tape loop at a required position in the column by means described in prior patent application Serial No. 165,482 (cited above) and in patent application Serial No. 706,184 filed December 30, 1957, now Patent No. 3,122,332, by Frederick G. Hughes, Jr., or in prior Patent No. 3,057,569 to J. A. Weidenhammer titled "Tape Feed Mechanism" filed May 28, 1952.

Reference is hereafter made to the invention as it may be provided in a tape transport of the type illustrated in FIGURE 1.

The entire motion of the tape by head 17 is controlled by cylindrical member 16 (capstan) which receives the tape with approximately a 180° wrap angle. Preferably, the back side (non-recorded side) of the tape is received against the surface of capstan 16 so that the delicate recording surface is not engaged.

It has been found that a solid coupling between a drive shaft and cylindrical member 16 results in undesirable oscillatory multivibrations being induced in the tape being driven by cylindrical member 16. To avoid the undesirable oscillations, either of two fluid couplings arrangements can be used, represented by the embodiments of FIGURE 3 or FIGURE 12. In FIGURE 3, only a single driving fluid coupling 31 is used, which is placed between a friction wheel 32 and member 16. In FIGURE 12, two fluid couplings 136 and 142 are provided, which also act as universal joints. However, the system of FIGURE 3 is preferable to the system of FIGURE 12 because the fluid couplings in FIGURE 12 involve more critical problems in matching the coupling friction and damping characteristics to the velocity and inertia characteristics of the system.

FIGURE 2 illustrates a top view of a tape driving and braking arrangement in which a fluid coupling 31 is located within member 16 to connect it to a driven friction wheel 32, which is engageable by either of oppositely rotating friction wheels 33 or 34.

The assembly containing cylindrical member 16 and driven wheel 32 is supported by bearing means disposed within frame members 30a and 30b. The frame members which also include supports 30c, d, e, f and g, are fastened within a rigid network supported by the frame of tape transport 10.

Oppositely rotating wheels 33 and 34 are driven by pulleys 38 and 44 respectively. Pulley 38 is fixed to a shaft 37 supported in bearings within the frame members 30e and 30f, coupled through a universal-type connection 36 to a shaft 35 fixed to wheel 33. Similarly pulley 44 is coupled to shaft 43 supported in bearings in frame members 30e and 30f, to a universal-type coupling 42 that connects to shaft 41 and wheel 34. Universal-type couplings 36 and 42 are of the type shown in FIGURES 10A and B. It includes a diaphragm 210 having four notches 211 spaced at 90° intervals. A solid flange 212 connects to shaft 35 or 41 and has opposite sides 213 and 214 connected to opposite edges of diaphragm 210 with bolts 221 and 222. Likewise a second solid flange 215 connects to shaft 37 or 43 and has opposite sides 216 and 217 connected to 90° displaced opposite edges of diaphragm 210 by bolts 223 and 224. The diaphragm flexes to allow angular variation of shaft 35 (or 41) with respect to 37 (or 43) during rotation. Furthermore, the diaphragm type of universal coupling with notches 211 provides less angular acceleration during each revolution of the coupling than do other well-known types of universal joints. Shafts 35 and 41 pass through openings 57 and 58 within the frame member 30d and are supported at their opposite ends by bearings within electro-mechanically actuated arms 51 and 54 pivotly supported on frame member 30d by spring-pivot connections 50 (shown in FIGURE 7). However, supporting members 51 and 54 are spring biased in a direction so that wheels 33 and 34 do not normally contact the surface of driven wheel 32.

Electro-mechanical actuators 52 and 55 are fixed to brackets 53 and 56 on support 30d. Selective energization of actuators 52 or 55 causes drive wheel 33 or 34 to engage friction wheel 32 in order to drive cylindrical member 16 in forward or backward directions. The distance of wheels 33 and 34 from wheel 32 is very slight when wheels 33 and 34 are not engaged, so that actuators 52 and 55 need move wheels 33 and 34 over only a very short distance in order to obtain quick engagement.

FIGURES 3 and 4 show a fluid coupling 31 provided between friction wheel 32 and cylindrical member 16 to overcome vibrational disturbances caused to the tape during engagement of wheel 33 or 34 with 32. In FIGURE 3, wheel 32 is constructed with a thin cylindrical metal surface connected to a hub 85 by a thin metallic web having numerous holes. Hub 85 is fastened to a shaft 70. Thus wheel 32 is light and has very little inertia. Shaft 70 is supported by bearings 91 and 92 in frame members 30a and 30b.

Cylindrical member 16 is positioned around the fluid-coupling arrangement at the opposite end of shaft 70 and hence is supported in cantilever fashion. FIGURE 3 illustrates a sectional view of fluid coupling 31. Cylindrical member 16 includes a capstan member 76, which has a hard rubber-type surface on a metallic cylinder supported by a web 82 having holes therein fastened to a housing 81 of fluid coupling 31. Housing 81 has a finned outer surface to assist air cooling, since heating occurs in the fluid during its use. The inner surface of housing 81 comprises the driven side of the fluid coupling. A highly-viscous silicone oil (such as 14,000 centistokes viscosity) is received between the inner surface of cylindrical member 81 and another cylindrical member 71 fastened to shaft 70. The outer surface of member 71 is the driving side of the fluid coupling and is spaced from the inner surface of member 81 by about two and one-half of one thousandth of an inch. Ball bearings 77 are located at the opposite ends of member 71 and support member 81 rotationally on member 71 and shaft 70. The space between members 81 and 71 is filled with the fluid. Seal 78a is provided between members 71 and 81 to seal the end of the fluid coupling and prevent fluid leakage. Gasket seal 78b prevents leakage between cap 79 and member 81. A cap 79 with an opening 181 is received over the outer end of the fluid coupling to fasten a flexible diaphragm 182 across an end of the coupling to allow temperature expansion and contraction of the fluid. It also acts as a seal to prevent fluid leakage by seal 78b at that end. The flexing of diaphragm 182 prevents loss of fluid through opposite seal 78a during temperature expansion cycles for the fluid.

The inner driving member 71 of the fluid coupling contains a plurality of cavities 72 (shown in FIGURE 4), which are filled with the fluid. Narrow slots 73 connect cavities 72 to the torque-coupling fluid space between members 71 and 81 and allow for free circulation. Any expansion in volume by the fluid due to temperature variation is compensated by the flexing of the diaphragm 182. Cavities 72 increase the replacement time intervals for the silicone fluid.

It has been found that at particular operating speeds for the capstan that the hammering effect on wheel 32 of wheels 33, 34 and 60 resulting from engagement may cause undesirable vibratory modes to capstan 31 that may adversely affect the tape being read or written by heads 17. In models constructed, it was found that no such difficulty was significant for such spurious oscillatory modes for certain speeds of operation, such as 112 inches per second of surface 76. However, it was found that at other operating speeds, such as 22 inches per second, significant vibration was observable. It was found that the vibrational characteristics could be changed by adding a rubber cylindrical member 84 between an edge of member 76 and a groove in a metallic member 83 received around the outer surface of member 81. Hence undesirable vibrations at certain speeds could be removed by controlling the position and parameters of items 83 and 84.

The brake wheel 60 is non-rotational when disengaged from disc 32. It is fixed to a shaft 63 which is connected through a universal coupling 64 (identical to 36 or 42) to the rotor of another fluid-coupling 65 that has its stator fixed to frame member 30f. Shaft 63 is supported through a ball bearing in an actuating arm 61 pivotably connected to the frame 30d. Arm 61 is actuatable by electro-mechanical device 62, as can be seen in FIGURE 9a. Shaft 63 passes through an opening 59 in supporting member 30d.

Fluid coupling 65 comprises a paddle-wheel type rotor element 92, which is fastened to a shaft 86 connected to coupling 64. Shaft 86 is supported by a pair of ball bearings sets 91 located on opposite sides of rotor 92. A stator frame 87 is fastened to frame member 30f and surrounds rotor 92. Stator 87 includes a cap 94 fastened to stator 87 by bolts 95. A highly viscous silicone fluid is received in the space between rotor 92 and stator 87.

A seal 90 between shaft 86 and stator 87 prevents leakage of the fluid from the coupling unit. The inner surface of stator 87 has fins 93 which oppose the paddle-wheel fins of rotor 92.

FIGURE 5 represents section 5—5 in FIGURE 2 and illustrates a capstan driving pulley arrangement. It couples a pulley 46 driven by a motor 47 to pulleys 38 and 44 which are driven in opposite directions by a belt 45. Belt 45 passes from pulley 46 alternately under an idler 95, over pulley 38, under pulley 44 and over an idler 96 before being returned to pulley 46.

Figure 9C:
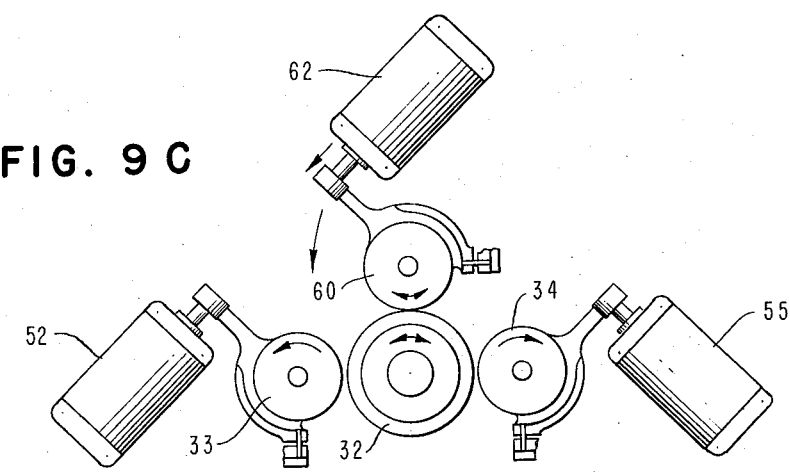

FIGURES 9A, B and C illustrate the various actuations that cause selective engagement of friction wheels 34, 60 or 33 to rotate the driven wheel member in one direction, to brake it, or to rotate it in the opposite direction. For example, the circuit shown in FIGURE 8 can be used to control the selective energization of electro-mechanical actuators 55, 62 and 52 by the control inputs F (forward), S (stop) or B (backward), which enable one of AND gates 121, 122 or 123 to connect a power source to a respective actuator. The actuators are electrically energized to engage and to disengage. Thus in FIGURE 9A actuator 52 is energized to push counter-clockwise rotating wheel 33 against friction wheel 32 in order to drive member 16 clockwise. FIGURE 9C illustrates energization of actuator 62 which causes braking wheel 60 to engage friction wheel 32 and stop it. Wheel 60 rotates only a small fraction of a turn before bringing wheel 32 to a halt due to the very high viscosity of the silicone fluid in fluid coupling 65. Thus the fluid absorbs much of the braking energy to reduce wear on the surfaces of wheel 32 and wheel 60. Wheel 60 is actuated twice as much as either wheel 33 or 34 because a stop command must intervene any command to change direction of capstan rotation. Wear on the surface of braking wheel 60 is evenly distributed due to its rotational characteristics.

When a tape movement in the opposite direction is required, actuator 55 is energized to push wheel 34 against wheel 32 which causes wheel 32 to rotate in a counter-clockwise direction to drive the tape in the opposite direction.

In any tape-movement reversing operation, actuator 62 is energized to engage at the same time that actuator 52 or 55 is energized to disengage. Hence braking wheel 60 is applied to friction wheel 32 immediately upon disengagement by the previously driving wheel 33 or 34 so that friction wheel 32 is stopped (and the braking energy substantially absorbed by fluid coupling 65) before the opposite wheel 33 or 34 is applied for reverse movement by simultaneous energization to engage its actuator 52 or 55 and to disengage actuator 62. By stopping wheel 32 before applying a contra-rotating wheel 33 or 34, a reduction in the wear to the surfaces of wheels 33 and 34 also occurs, since a direct application of a contra-rotating wheel 33 or 34 to wheel 32 would require the braking energy prior to rotation reversal of wheel 32 to be absorbed by rubbing of the surface of disc 32 with wheel 33 or 34 resulting in undue wear.

The surface of friction wheel 32 is metallic. However, the surfaces of wheels 34, 60 and 33 may be a plastic or rubber compound molded in a cylindrical form which is attached to the surface of the respective wheels 34, 60 and 33. The plastic or rubber surfaces thus receive any resulting wear, and respective wheels are readily replaceable by easy access from the front of tape machine 10.

The surface of tape driving member 16 is also made of rubber or plastic material having a required coefficient of friction for engaging the tape so that tape slippage will not occur during the very quick accelerations and decelerations of capstan 16. Furthermore, cylindrical surface device 16 can be easily removed from the front of tape transport 10 whenever replacement is required.

An unusual result obtained by fluid coupling 31 is that it speeds up a tape read or write operation, rather than slowing it down.

FIGURE 6 explains how the fluid coupling obtains quicker effective tape acceleration than would be obtainable with a direct solid shaft connection between friction wheel 32 and tape driving device 16. Many present-day digital tape transports permit a tape velocity variation ±5% from a nominal tape velocity V, which is the speed of the capstan surface. Thus when tape is started prior to reading data recorded on tape, it is necessary that the tape be accelerated and that its velocity be stabilized within ±5% of the nominal velocity V.

Curve 106 in FIGURE 6 illustrates the acceleration and velocity characteristic for tape driven by capstan 16 fluid-coupling unit 31 is eliminated and capstan 16 is solidly connected to drive wheel 32 by a shaft (not shown). While there is a very fast initial acceleration indicated by the steepness of the initial part of curve 106, a significant oscillation occurs thereafter which has excursions that significantly exceed the ±5% range about the operating velocity V. Tape oscillations due to having a solid coupling (not shown) are partly due to torsional vibrations of capstan 16 that would be caused by the elastic effect of a solid coupling, but are primarily due to discontinuities in the acceleration of the tape. Thus, a relatively long period of time $t_1$ would expire before the velocity of the tape could stabilize to within the ±5% variation that is required to begin a tape read or write function. Consequently, any reading or writing operation on tape driven by capstan 16, if it had a solid coupling (not shown), would have to be delayed by a relatively long time (exceeding $t_1$ from the energization of actuator 52 or 55).

However, where fluid coupling 31 is provided, a much shorter delay for reading or writing tape is obtained. In this case the more damped response illustrated by curve 107 in FIGURE 6 is obtained. Although the initial acceleration of curve 107 is not as high as the initial response of curve 106, it is seen that once curve 107 enters the ±5% velocity range at time $t_2$ that thereafter the velocity of the tape always remains within the ±5% range. Accordingly, any tape read or write operation need not be delayed beyond $t_2$, which occurs much earlier than $t_1$. The oscillatory response of tape velocity to a start tape operation is shown by curve 107 to be underdamped. It is apparent however that a wide range of damping between underdamping and critical damping is permissible which allows the oscillatory velocity of the tape to be confined within the ±5% range. This damping characteristic of the fluid coupling can be controlled by choice of viscosity for fluid coupling 16.

Other energy-dissipating coupling means can be substituted for fluid coupling means 31 or 65 and a degree of operability is obtainable, but not to the degree obtainable with the embodiment provided before, which has had a model operate satisfactorily for hundreds of millions of starts and stops before any change in silicone fluid was required. Mechanical frictional slidable couplings cannot be expected to have this order of reliability.

FIGURE 12 illustrates a tape drive system wherein drive fluid couplings 136 and 142 couple the constantly rotating drive shafts 37 and 43 to friction wheels 33 and 34 respectively. A solid shaft coupling 170 is provided between friction wheel 32 and tape driving member 16. Shaft 170 is supported by bearings 91 and 92 in the same manner as described for a shaft 70 in FIGURE 3. Each of fluid couplings 136 and 142 allows for a slight bit of angular movement for its shaft 35 or 41, so that a universal type coupling affect is obtained. The angular movement is slight since only a very small fraction of one degree of movement is needed to accommodate wheel 33 or 34 across a gap of only a few thousandths of an inch to disc 32.

Wheels 33 and 34 are actuated in FIGURE 12 in the same manner as described in FIGURES 9A, B and C.

FIGURES 11A and B illustrate a detailed construction for a type of fluid coupling which may be used for 136 or 142. In FIGURE 12 coupling 136 comprises a rotor 179 fastened to shaft 35. On the other hand a casing part 176 is fastened to shaft 37 and another casing portion 183 is fastened to casing part 176 by bolts 177 providing a cavity surrounding the rotor 179. The cavity is filled with silicone fluid of a highly viscous nature, such as having a viscosity of 14,000 centistokes. The casing is supported rotationally on shaft 35 by a bearing 171. Fluid leakage from the cavity is prevented by a seal 173 which is retained by a cap 174 which is fastened to casing portion 183 by bolts 172. The rotor 179 in FIGURE 11B has a plurality of varying depth grooves 180 selectively formed therein to obtain a desirable coupling characteristic in combination with the fluid of a required viscosity. The spacing between vane member 179 and the casing members 176 and 183 is only a few one thousandths of an inch.

FIGURE 13 illustrates the type of coupling response needed by fluid couplings 136 and 142. Line 157 represents the normal velocity of shaft 35 when wheel 33 is disengaged and shaft 37 is operating at its normal steady-state velocity. At a time $t_a$, actuator 52 is energized. It takes some time, such as a millisecond after energization before wheel 33 engages the surface of wheel 32 at time $t_b$. At engagement, a dip occurs in the velocity of wheel 33 represented by curve 158. Also after engagement the velocity of tape, represented by the angular velocity of shaft 170, is changed from 0 to a steady-state velocity determined by shaft 35. The velocity change in shaft 170 from zero to a normal driving velocity 159 is represented by any of curves 166, 167 or 168. Only curve 167 is desirable (or a curve very closely related to 167). Curve 167 tangentially meets curve 158 at point 162 at time $t_c$. Because of this tangential meeting of velocities, there is no discontinuity in the rate of velocity change of shaft 170. After time $t_c$, its velocity smoothly varies along curve 158 up to the steady-state velocity of line 159.

On the other hand, if the response of the fluid-coupling 136 is not correct (considering the inertial load and the frictional characteristics during the engagement of wheels 33 and 32) the acceleration of shaft 170 can occur either too fast or too slow as represented by curves 166 or 168, respectively. If too fast, it is noted that curve 166 intersects curve 158 at point 161 which is non-tangential. Thus a discontinuity in the velocity of shaft 170 occurs at the time of point 161 where the velocity curve suddenly changes from the rate along curve 166 to the rate along curve 158. This discontinuity in velocity is transferred to the tape to set up vibrations within it which normally would exceed the ±5% tolerance in velocity previously described.

On the other hand if the acceleration of shaft 170 is too slow as represented by curve 168, it will meet curve 159 at point 163 where a discontinuity occurs in the velocity curve for shaft 170 to again cause excessive velocity variation due to vibration to a tape being started. For this reason the design of fluid couplings 136 and 142 is relatively critical, which is not found with the fluid coupling described in relation with FIGURES 3 and 4.

While the invention has been particularly shown and described with reference to preferred embodiments there-

What is claimed is:

1. A tape driving arrangement for quickly accelerating tape to a required speed,
comprising a continuously rotating friction wheel, a capstan,
a capstan friction wheel, a tape engaging said capstan,
energy dissipative fluid coupling means connectable serially with said capstan friction wheel and said capstan,
and remotely-controlled means for engaging said rotating friction wheel with the surface of said capstan friction wheel to quickly accelerate said capstan.

2. A tape driving arrangement for quickly accelerating tape to a required speed,
comprising a rotating shaft source, a capstan,
a fluid coupling, serially connected between said capstan and said source, a tape engaging said capstan,
and an engageable-disengageable coupling means connected serially between said capstan and said source.

3. A tape driving arrangement comprising, a capstan continuously engaging tape and capable of smoothly and quickly accelerating and decelerating the tape,
a first drive friction wheel constantly rotating in a clockwise direction,
a second drive friction wheel constantly rotating in a counterclockwise direction,
a pair of matched fluid-coupling means respectively connected to said first and second drive friction wheels,
a capstan friction wheel,
electro-mechanical actuator means coupled respectively to said first and second friction wheels to cause engagement of either said first or said second drive friction wheel with said capstan friction wheel to cause it to rotate in one or the other direction to drive said tape in one or the other of said directions.

4. A tape driving arrangement as defined in claim 3, in which braking means is located adjacent said capstan friction wheel,
and further electro-mechanical means being connected to said braking means capable of selectively bringing said braking means into engagement with said capstan friction wheel.

5. A tape driving and braking arrangement comprising a single capstan for continually engaging tape while driving or braking it, a capstan friction wheel,
first-type fluid coupling means connected serially with said capstan,
first, second and third friction wheels disposed adjacent to said capstan friction wheel for selective engagement therewith,
means for driving said first and third friction wheels continually in opposite directions,
second fluid coupling means connecting said second friction wheel to a frame member,
and means for selectively engaging any one of said first, second or third friction wheels to drive said capstan in either direction through said first-type fluid coupling means, or engaging said second friction wheel to stop said capstan through said second fluid coupling means,
whereby braking energy is substantially dissipated within said second fluid coupling rather than on the surface of said second friction wheel and said capstan friction wheel.

6. A tape driving and braking arrangement as defined in claim 5 in which said first-type fluid coupling means is connected between said capstan friction wheel and a rotational drive source.

7. A tape driving arrangement as defined in claim 5 in which said capstan is positioned around said first-type fluid coupling means.

References Cited by the Examiner

UNITED STATES PATENTS

| | | | |
|---|---|---|---|
| 2,449,335 | 9/1948 | Sowa. | |
| 2,542,740 | 2/1951 | Washburn | 74—202 |
| 2,704,138 | 3/1955 | Gibson | 188—80 |
| 2,731,844 | 1/1956 | Washburn | 74—202 |
| 2,878,684 | 3/1959 | Kerfoot | 198—203 |
| 3,038,678 | 6/1962 | Papst | 226—51 X |
| 3,045,780 | 7/1962 | Lees | 188—90 |

FOREIGN PATENTS 747,317    4/1956    Great Britain.

M. HENSON WOOD, Jr., *Primary Examiner.*

ANDRES H. NIELSEN, SAMUEL F. COLEMAN,
*Examiners.*